United States Patent
Hou et al.

(10) Patent No.: US 8,850,248 B2
(45) Date of Patent: Sep. 30, 2014

(54) MULTI-CORE ELECTRONIC SYSTEM HAVING A RATE ADJUSTMENT MODULE FOR SETTING A MINIMUM TRANSMISSION RATE THAT IS CAPABLE FOR MEETING THE TOTAL BANDWIDTH REQUIREMENT TO A SHARED DATA TRANSMISSION INTERFACE

(75) Inventors: Ping-Cheng Hou, Zhubei (TW);
Cheng-Yu Lu, Chiayi County (TW);
Chieh-Wen Shih, Hsinchu (TW);
Jen-Shi Wu, Zhubei (TW);
Chung-Ching Chen, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 481 days.

(21) Appl. No.: 13/190,645

(22) Filed: Jul. 26, 2011

(65) Prior Publication Data
US 2012/0272080 A1   Oct. 25, 2012

(30) Foreign Application Priority Data
Apr. 22, 2011   (TW) .............................. 100114162 A

(51) Int. Cl.
*G06F 1/00*   (2006.01)
*G06F 1/04*   (2006.01)
*G06F 1/32*   (2006.01)

(52) U.S. Cl.
CPC ............. *G06F 1/324* (2013.01); *Y02B 60/1246* (2013.01); *G06F 1/3268* (2013.01); *G06F 1/3206* (2013.01)

USPC ........... 713/322; 713/600; 370/468; 370/229; 370/230

(58) Field of Classification Search
CPC .... G06F 9/3879; G06F 9/3861; G06F 9/3885
See application file for complete search history.

(56) References Cited

U.S. PATENT DOCUMENTS

| | | | |
|---|---|---|---|
| 7,281,148 B2* | 10/2007 | Munguia ........................ | 713/322 |
| 7,593,433 B1* | 9/2009 | Wu et al. ....................... | 370/537 |
| 7,843,965 B2* | 11/2010 | Lai et al. ....................... | 370/468 |
| 7,886,131 B1 | 2/2011 | Kang | |
| 8,347,301 B2* | 1/2013 | Li et al. .......................... | 718/104 |
| 8,607,035 B2* | 12/2013 | Kimelman .................... | 712/244 |
| 2003/0043741 A1* | 3/2003 | Mukai et al. .................. | 370/229 |
| 2004/0202175 A1* | 10/2004 | Horioka et al. ............. | 370/395.1 |
| 2005/0044442 A1* | 2/2005 | Barr et al. ..................... | 713/600 |
| 2005/0216607 A1 | 9/2005 | Munguia | |
| 2007/0064604 A1* | 3/2007 | Chen et al. .................... | 370/230 |
| 2007/0248007 A1* | 10/2007 | Rajan ............................. | 370/230 |
| 2007/0280126 A1* | 12/2007 | Liu et al. ....................... | 370/252 |
| 2008/0189522 A1* | 8/2008 | Meil et al. ..................... | 712/220 |

(Continued)

OTHER PUBLICATIONS

Taiwan Office Action dated Feb. 10, 2014 citing prior art, 7 pages.

*Primary Examiner* — Thomas Lee
*Assistant Examiner* — Aurel Prifti
(74) *Attorney, Agent, or Firm* — Edell, Shapiro & Finnan, LLC

(57) ABSTRACT

A multi-core electronic system for accessing a data storage device includes a plurality of processors, a data transmission interface and a rate adjustment module. The processors respectively provide a bandwidth requirement, and communicate with the data storage device via the shared data transmission interface. The rate adjustment module receives the bandwidth requirements, and determines a transmission rate of the data transmission interface according to the bandwidth requirements.

11 Claims, 5 Drawing Sheets

(56) References Cited

U.S. PATENT DOCUMENTS

| | | | |
|---|---|---|---|
| 2009/0248976 A1* | 10/2009 | Rotithor | 711/113 |
| 2009/0307464 A1* | 12/2009 | Steinberg et al. | 712/31 |
| 2010/0214911 A1* | 8/2010 | Cooke et al. | 370/229 |
| 2010/0254407 A1* | 10/2010 | Tanaka et al. | 370/468 |
| 2010/0296520 A1* | 11/2010 | Matthews et al. | 370/468 |
| 2011/0153724 A1* | 6/2011 | Raja et al. | 709/203 |
| 2013/0117766 A1* | 5/2013 | Bax et al. | 719/323 |

\* cited by examiner

MULTI-CORE ELECTRONIC SYSTEM HAVING A RATE ADJUSTMENT MODULE FOR SETTING A MINIMUM TRANSMISSION RATE THAT IS CAPABLE FOR MEETING THE TOTAL BANDWIDTH REQUIREMENT TO A SHARED DATA TRANSMISSION INTERFACE

This application claims the benefit of Taiwan application Serial No. 100114162, filed Apr. 22, 2011, the subject matter of which is incorporated herein by reference.

BACKGROUND OF THE INVENTION

1. Field of the Invention

The invention relates in general to a multi-core electronic system, and more particularly to a technique for adjusting a data transmission rate of a multi-core system.

2. Description of the Related Art

Power consumption of a circuit increases as an operating frequency of the circuit increases, and therefore many circuits adopt different clock rates for accommodating different operating situations, so as to achieve power saving. Taking a central processor of a computer system for example, a processor 10 generally communicates with a storage unit 14 via a data transmission interface 12, as shown in FIG. 1. Apart from data, the processor 10 also sends control signals, e.g., clock rates for controlling a transmission rate of the data transmission interface 12 to the storage unit 14.

When the processor 10 is in a normal operation mode, the processor 10 may set the data transmission interface 12 to a medium rate for transmitting data. When no operations are to be handled, the processor 10 may then command the data transmission interface to operate at a lower frequency to reduce power consumption. On the contrary, when the processor 10 is required to read a large amount of data from the storage unit 14 (e.g., when handling video playback procedures) or write a large amount of data to the memory 14, the processor 10 may request the data transmission interface 12 to operate at a maximum operating frequency, so as to complete the required processing in time.

FIG. 2 shows a schematic diagram of a corresponding relationship between an operating status of a processor and a clock rate of a data transmission interface. For a single-core electronic system, since a required interface transmission bandwidth can be acquired in advance by the single-core electronic system when the single-core electronic system switches from one task to another, an interface transmission rate between the processor and a data storage device such as a hard disk may be directly determined according to requirements of the processor itself. More specifically, the processor in a single-core electronic system is capable of switching the clock rate of the data transmission interface according to its operating status.

To enhance operating speeds of electronic systems, certain electronic system manufacturers wish to replace the conventional single-core electronic systems with multi-core electronic systems. For a multi-core system, tasks executed by multiple processors in the multi-core system within a same period may vary. It is therefore an essential issue to provide a solution for determining a transmission rate of a data transmission interface under the situation that a same data transmission interface is to be shared by the multiple processors to communicate with a data storage device.

SUMMARY OF THE INVENTION

The invention is directed to a multi-core electronic system and a rate adjustment device applied to the multi-core electronic system. With the multi-core electronic system and the rate adjustment device, system bandwidth requirements are effectively integrated to quickly auto-adjust an operating clock of a data transmission interface to achieve power saving.

According to an aspect of the present invention, a multi-core electronic system for accessing a data storage device is provided. The multi-core electronic system comprises a plurality of processors, a data transmission interface and a rate adjustment module. The processors respectively provide a bandwidth requirement, and communicate with a storage device via the shared data transmission interface. The rate adjustment module receives the bandwidth requirements respectively provided by the processors, and determines a transmission rate of the data transmission interface according to the bandwidth requirements.

According to another aspect of the present invention, a rate adjustment device applied to a multi-core electronic system. The multi-core electronic system comprises a plurality of processors, which communicate with a data storage device via a shared data transmission interface. The rate adjustment device comprises a receiving unit and a rate adjustment unit. The receiving unit receives a bandwidth requirement respectively provided by the processors, and the rate adjustment unit determines a transmission rate of the data transmission interface according to the bandwidth requirements.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
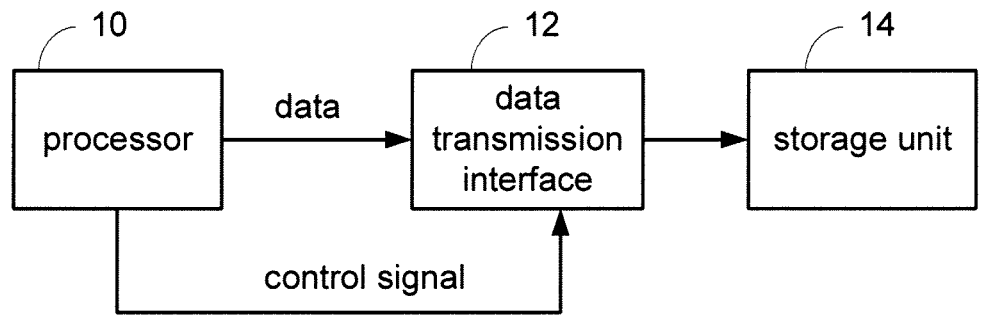
FIG. 1 is a schematic diagram illustrating connections between a processor, a data transmission interface and a data storage device.
Figure 2:
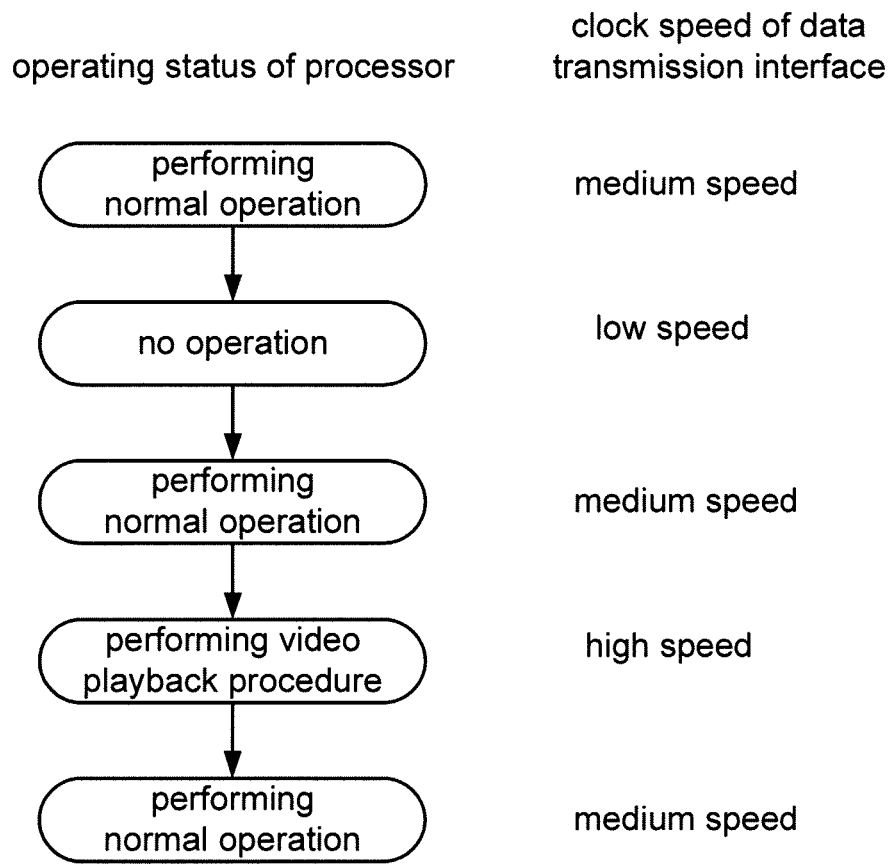
FIG. 2 is a schematic diagram of a corresponding relationship between an operating status of a processor and a clock rate of a data transmission interface.
Figure 3:
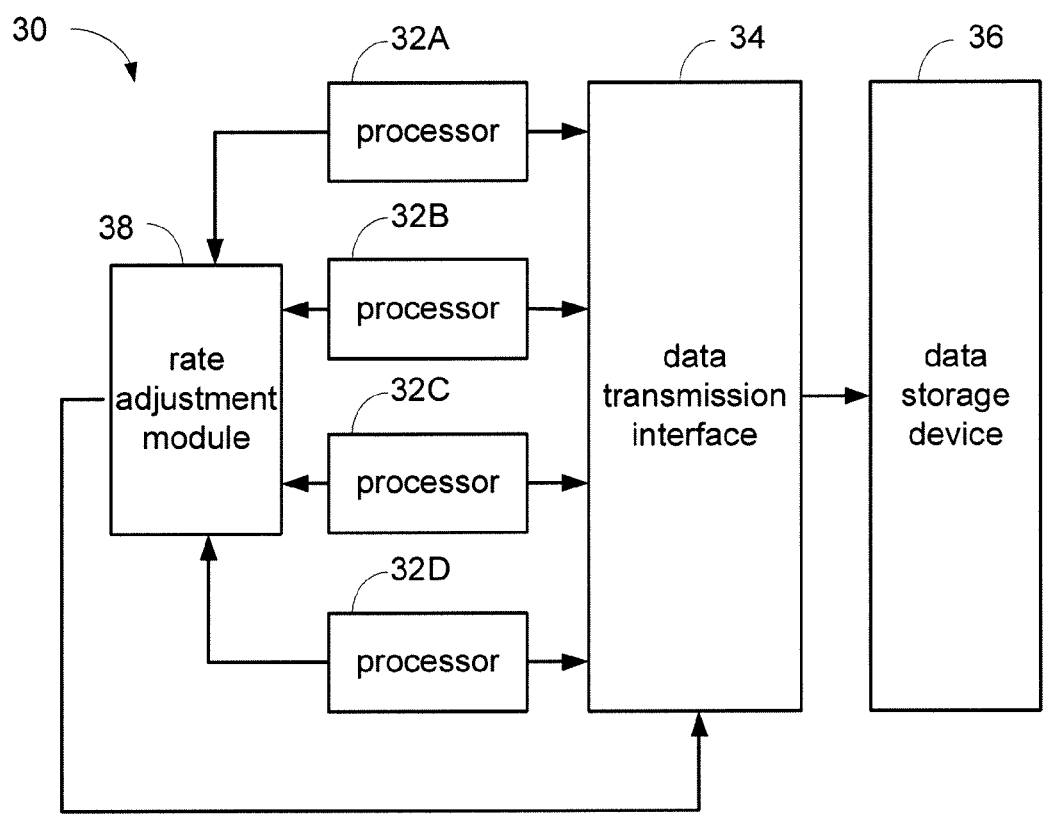
FIG. 3 is a partial block diagram of a multi-core electronic communication device according to an embodiment of the present invention.

FIG. 3 shows a partial block diagram of a multi-core electronic system according to an embodiment of the present invention. For example, the system can be a personal computer system or a mobile communication device. A mobile communication device adopting a multi-core electronic system structure is taken as an example, and is depicted as follows. As shown in the partial block diagram, a mobile communication device 30 comprises four processors 32A to 32D; the processors communicate with a data storage device 36 via a shared data transmission interface 34. In practice, the data storage device 36 may be a memory installed in the mobile communication device 30 (e.g., a built-in memory or a pluggable memory), but is not limited thereto.

The rate adjustment module 38 receives a bandwidth requirement respectively from the processors 32A to 32D, and determines a transmission rate of the data transmission interface 34 according to the bandwidth requirements. For example, supposing bandwidth values associated with the bandwidth requirements of the processors 32A to 32D are respectively 50 MB/s, 50 MB/s, 25 MB/s and 25 MB/s, the rate adjustment module 38 adds up values of the above bandwidth requirements to a total bandwidth requirement of 150 MB/s, and commands the data transmission interface 34 to transmit data at a rate greater than 150 MB/s according to the total bandwidth requirement. In other words, an operating frequency of the data transmission interface 34 is set at a value capable of handling a data transmission rate of 150 MB/s.

Assume that a maximum rate supported by the data transmission interface is 200 MB/s for example. Obviously, by setting the transmission rate of the data transmission interface 34 to 150 MB/s, operating requirements of the processors 32A to 32D can be successfully completed with reduced power consumption, compared to power consumption when data transmission interface 34 operates at a transmission rate of 200 MB/s. Therefore, in consideration of power consumption of an operating circuit, the rate adjustment module 38 may select a corresponding minimum transmission rate that fulfills the total bandwidth requirement according to the total bandwidth requirement; that is, the rate adjustment module 38 sets the data transmission interface 34 to a rate of 150 MB/s (a rate capable of fulfilling the total bandwidth requirement) to transmit data to achieve power saving.

In practice, the rate adjustment module 38 may be an independent hardware circuit, dedicated for determining the transmission rate, outside the processors 32A to 34D. Compared to a design that assigns the above rate adjustment function to software handled by one processor among the processors 32A to 32D, one advantage of handling the rate adjustment with hardware is that operation performance of the such an assigned processor is not reduced, since original operations of the processors are not interrupted due to handling of the rate adjustment; that is, increasing/decreasing the transmission rate to meet bandwidth requirements.

More specifically, the rate adjustment module 38 periodically checks whether the transmission rate needs to be adjusted according to the bandwidth requirements. Alternatively, the bandwidth requirement may include an imminence index, according to which the rate adjustment module 38 determines when to adjust the transmission rate of the data transmission interface 34. For example, when the imminence index sent by the processor 32A indicates a high imminence or a high priority for its operations, the rate adjustment module 38 accordingly increases the transmission rate of the data transmission rate 34 immediately. When the imminence indices sent from the processors 32A to 34D do not show a high imminence or a high priority, the rate adjustment module 38 may wait for a predetermined period before adjusting the transmission rate of the data transmission interface 34 rather than adjusting the transmission rate immediately.

Figure 4:
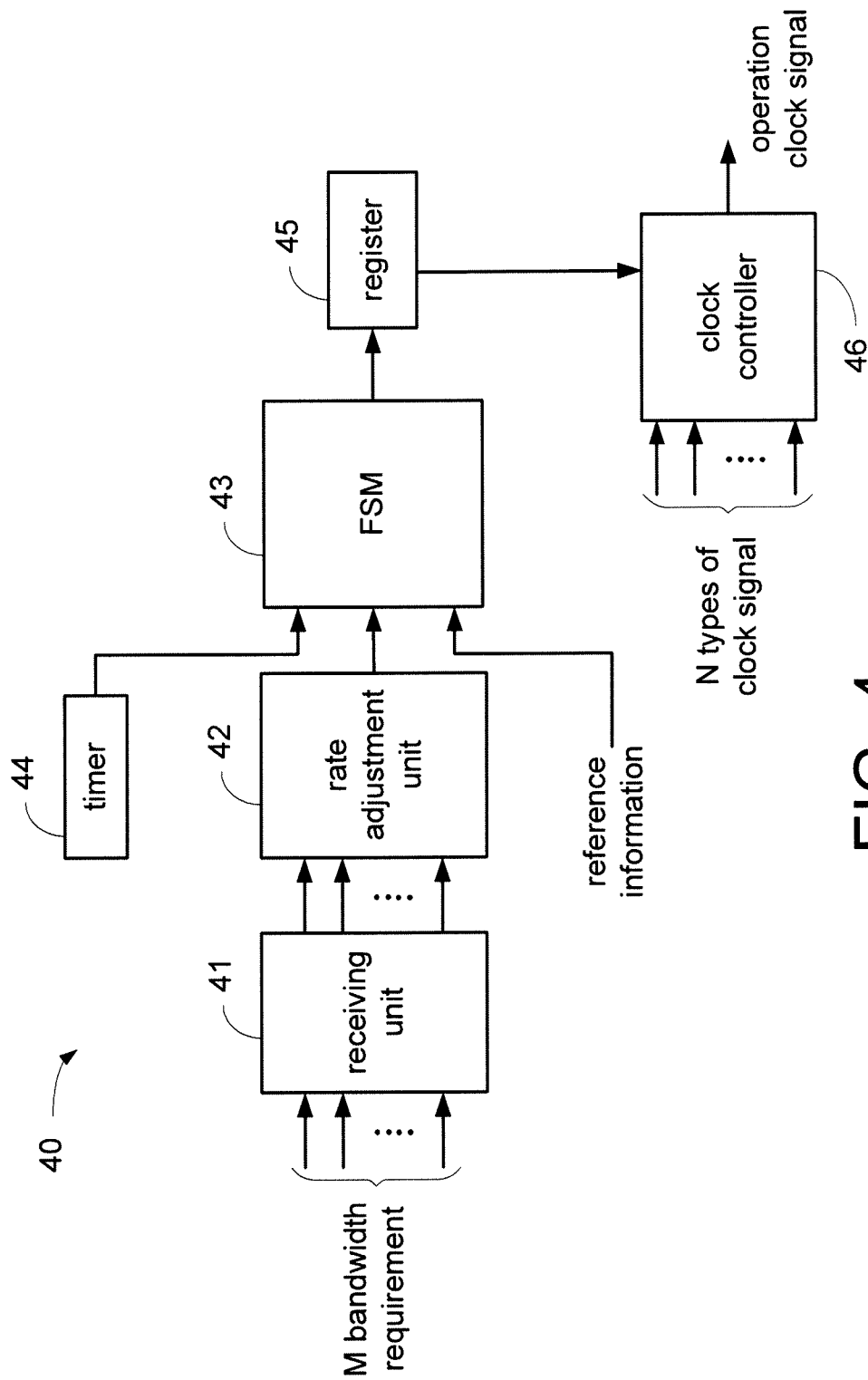
FIG. 4 is a block diagram of a rate adjustment device according to an embodiment of the present invention.

FIG. 4 shows a block diagram of a rate adjustment module applicable to a multi-core electronic system according to another embodiment of the present invention. The multi-core electronic system adopting a rate adjustment device 40 comprises M processors (not shown in FIG. 4), where M is an integer greater than 1. The processors communicate with a data storage device (e.g., a hard disk or a pluggable memory) via a shared data transmission interface. The rate adjustment device 40 integrates bandwidth requirements of the M processors accordingly to adjust a transmission rate of the data transmission interface. As shown in FIG. 4, the rate adjustment device 40 comprises a receiving unit 41, a rate adjustment unit 42, a finite state machine (FSM) 43, a timer 44, a register 45, and a clock controller 46.

The receiving unit 41 respectively receives the bandwidth requirements from the M processors, and transmits the bandwidth requirements to the rate adjustment unit 42. The rate adjustment unit 42 calculates a transmission rate recommended to the data transmission interface. In this embodiment, the M processors are capable of respectively sending a bandwidth requirement to the receiving unit 41 at all times; however, the FSM 43 does not adjust the transmission rate at all times, but operates according to a predetermined interval T set by the timer 44. That is to say, for every interval T, the FSM 43 selects a group of settings corresponding to the recommended transmission rate recommended by the rate adjustment unit 42 from predetermined reference information, and writes the group of settings into the register 45 to serve as control signals for the clock controller 46. In this embodiment, the clock controller 46 selects one from N types of different clock signals as operating clock signals for the data transmission interface, where N is an integer greater than 1.

As stated above, in this embodiment, the rate adjustment unit 42 adds up M bandwidth requirements to a total bandwidth requirement, and determine the transmission rate according to the total bandwidth requirement. Similarly, the rate adjustment unit 42 selects a corresponding minimum transmission rate capable of meeting the total bandwidth requirement as the transmission rate, so as to achieve power saving. Furthermore, in another embodiment, a transmission rate range supported by the data transmission interface 34 may be divided into different intervals for selecting a group of settings from the above predetermined reference information. Take the maximum transmission rate supported by the data transmission of 200 MB/s as an example. A transmission rate range 0 to 200 MB/s supported by the data transmission interface 34 is equally divided into four intervals for facilitating selecting a group of settings from the reference information; that is, the transmission rate range is divided into 0 to 50 MB/s, 51 to 100 MB/s, 101 to 150 MB/s, and 151 to 200 MB/s. Supposing the total bandwidth requirement falls within the interval 101 to 150 MB/s, the FSM 43 writes a group of settings corresponding to the transmission rate of 150 MB/s to the register 45. Furthermore, the rate adjustment unit 40 may be designed to send notifications of a modified transmission rate to the processors once the settings in the register 45 are modified.

Figure 5:
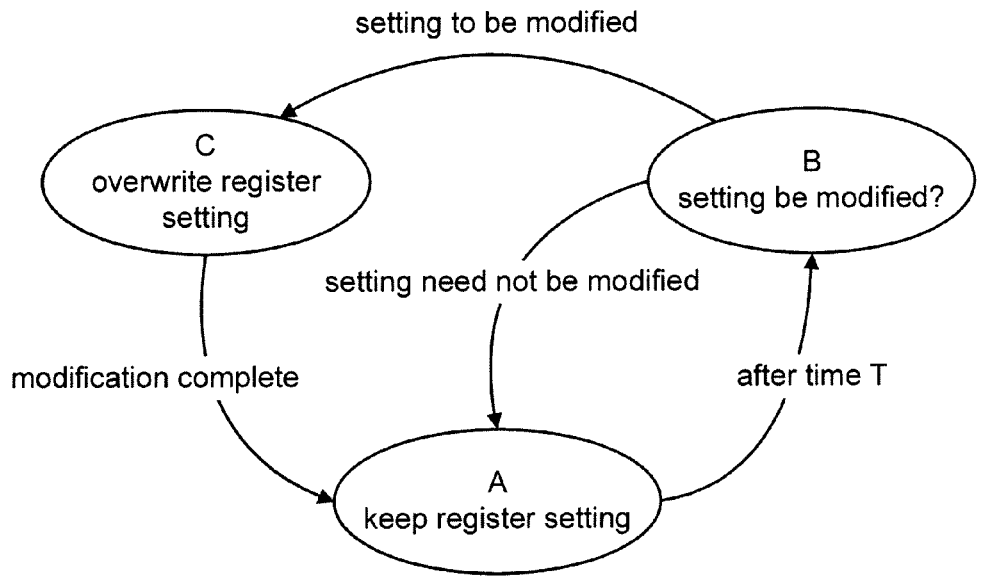
FIG. 5 is a schematic diagram of illustrating states of a finite state machine (FSM) according to an embodiment of the present invention.

FIG. 5 shows a schematic diagram of state transitions of the FSM 43. The default state of the FSM 43 is "A: keep register setting", and enters "B: setting be modified?" state. When the recommended transmission rate is the same as that from the previous value, the setting need not be modified, and so the FSM 43 returns to "A: keep register setting" state. Conversely, when the transmission rate suggested by the rate adjustment unit 42 is different from the previous suggested value, it means that the settings in the register 45 are to be modified, and the FSM 43 enters "C: overwrite register setting" state and returns to "A: keep register setting" state once the modification is complete.

Figure 6:
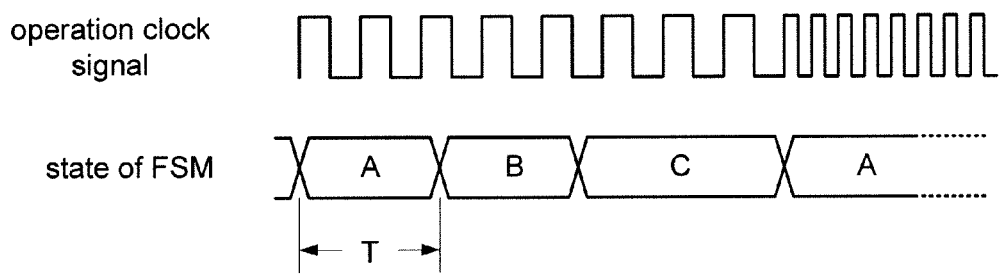
FIG. 6 is a timing diagram of an example of an operating clock and states of an FSM according to an embodiment of the present invention.

FIG. 6 is a timing diagram of an operating clock signal of the clock controller 46 and states of the FSM 43 according to an embodiment of the present invention. In the embodiment, after the FSM 43 sequentially passes through "A: keep register setting", "B: setting be modified?", and "C: overwrite register setting" states, new settings are written to the register 45, and a frequency of the operating clock signal changes accordingly.

In another embodiment, the bandwidth requirement provided by the processors to the receiving unit 41 may include an imminence/priority index, with reference to which the FSM 43 may determine when to adjust the settings of the register 45. For example, when the imminence index sent by a certain processor indicates a high imminence or a high priority for its operations, the rate adjustment unit 42 accordingly commands the FSM 43 to immediately modify the settings in the register 45 to increase the frequency of the operating clock signal outputted by the clock controller 46.

Figure 7:
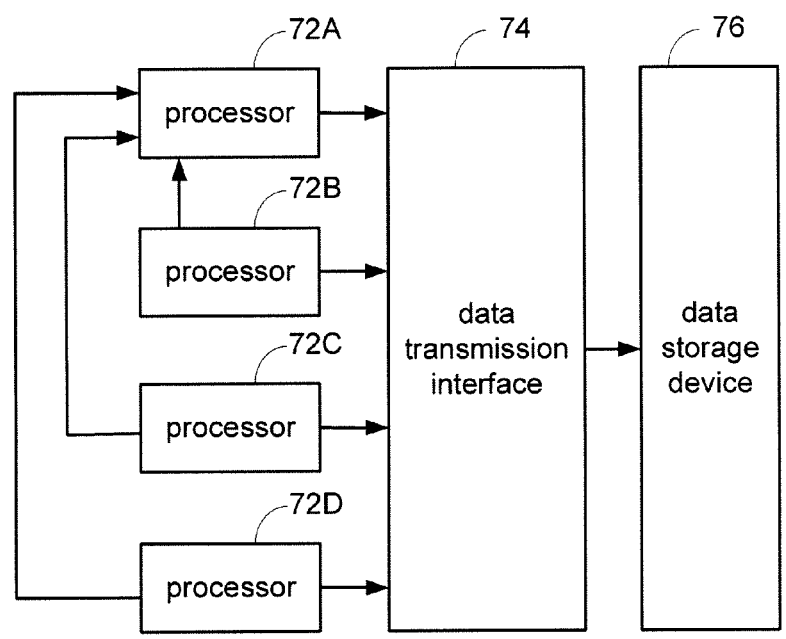
FIG. 7 is a partial block diagram of a multi-core electronic system according to an embodiment of the present invention.

In yet another embodiment of the present invention, the above transmission rate adjustment can be realized using software, which is handled by a certain predetermined processor in the multi-core electronic system. As shown in FIG. 7, the rate adjustment procedure may be a software program executed by a processor 72A. Processors 72A to 72D communicate with a data storage device 76 via a shared data transmission interface 74. The processors 72B to 72D send, respectively, bandwidth requirements to the processor 72A, which then consolidates its own bandwidth requirement with those of others received, and sends a command for adjusting the transmission rate to the data transmission interface 74.

In practice, unless an imminent bandwidth requirement arises, the time for executing the rate adjustment software program may be inserted right after a previous operation is processed to a certain stage, or in a blank interval between operating procedures, thereby avoiding most interventions to other operation tasks of the processor 72A. Similarly, the processor 72A may send out notifications of modified transmission rates to the processors once the transmission rate of the data transmission interface 74 is modified.

In conclusion, the multi-core system and rate adjustment device of the present invention are capable of effectively integrating bandwidth requirements of the system as well as quickly auto-adjusting an operating clock of a data transmission interface to achieve power saving. Furthermore, when the present invention is realized by a dedicated hardware structure, the corresponding circuit structure is quite simple such that minimal increase in hardware cost of the multi-core electronic system is added without undesirably affecting operating performances of processors, thereby providing an optimal bandwidth requirement total solution.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-core electronic system, configured to access a data storage device, the multi-core electronic system comprising:
a plurality of processors each configured to provide a bandwidth requirement, wherein each bandwidth requirement is associated with a bandwidth value;
a shared data transmission interface, via which the processors are configured to communicate with the data storage device, wherein the shared data transmission interface supports multiple transmission rates, each associated with one of a plurality of intervals of transmission rates; and
a rate adjustment module, configured to receive the bandwidth requirements, generate a total bandwidth requirement from addition of the bandwidth values of the bandwidth requirements, select a minimum transmission rate that is capable of meeting the total bandwidth requirement, and provide the minimum transmission rate to the shared data transmission interface,
wherein the rate adjustment module is further configured to select a group of settings associated with the minimum transmission rate from predetermined reference information according to the interval into which the minimum transmission rate falls.

2. The multi-core electronic system according to claim 1, wherein the rate adjustment module is configured to periodically check whether the minimum transmission rate needs to be adjusted.

3. The multi-core electronic system according to claim 1, wherein the bandwidth requirement comprises an imminence index, and the rate adjustment module is configured to determine when to adjust the minimum transmission rate according to the imminence index.

4. The multi-core electronic system according to claim 1, wherein the rate adjustment module is independent from the processors and is dedicated for determining the minimum transmission rate according to the bandwidth requirements.

5. The multi-core electronic system according to claim 1, wherein the adjustment module is realized by a software program executed by one of the processors.

6. The multi-core electronic system according to claim 1, wherein the data storage device comprises a memory built in the multi-core electronic system or a pluggable memory applicable to the multi-core electronic system.

7. The multi-core electronic system according to claim 1, wherein the rate adjustment module comprises a finite state machine configured to control changes to the minimum transmission rate.

8. A rate adjustment device, applicable to a multi-core electronic system, the multi-core electronic system comprising a plurality of processors and communicating with a data storage device via a shared data transmission interface, the rate adjustment device comprising:
a receiving unit, configured to receive a plurality of bandwidth requirements respectively provided by the processors, wherein each bandwidth requirement associates with a bandwidth value; and
a rate adjustment unit, configured to generate a total bandwidth requirement from addition of the bandwidth values of the bandwidth requirements, select a minimum transmission rate capable of meeting the total bandwidth requirement, and provide the minimum transmission rate to the shared data transmission interface,
wherein the shared data transmission interface supports multiple transmission rates, each associated with one of a plurality of intervals of transmission rates, and
wherein the rate adjustment unit is configured to select, from predetermined reference information, a group of settings associated with the minimum transmission rate according to the interval into which the minimum transmission rate falls.

9. The rate adjustment device according to claim 8, wherein the rate adjustment unit is configured to periodically check whether the minimum transmission rate needs to be adjusted.

10. The rate adjustment device according to claim 8, wherein the bandwidth requirement comprises an imminence index, and the rate adjustment unit is configured to determine when to adjust the minimum transmission rate according to the imminence index.

11. The rate adjustment device according to claim 8, further comprising a finite state machine configured to control changes to the minimum transmission rate.

* * * * *